(12) United States Patent
Hausladen et al.

(10) Patent No.: US 6,451,955 B1
(45) Date of Patent: Sep. 17, 2002

(54) METHOD OF MAKING A POLYIMIDE IN A LOW-BOILING SOLVENT

(75) Inventors: Michael C. Hausladen, Amherst; Jin-O Choi, Getzville, both of NY (US)

(73) Assignee: Sumitomo Bakelite Company Limited, Tokyo (JP)

( * ) Notice: Subject to any disclaimer, the term of this patent is extended or adjusted under 35 U.S.C. 154(b) by 0 days.

(21) Appl. No.: 09/676,295

(22) Filed: Sep. 28, 2000

(51) Int. Cl.[7] ............... C08G 73/10; C08G 69/26; C08G 77/04; C08G 69/28
(52) U.S. Cl. ............... 528/170; 528/26; 528/28; 528/38; 528/125; 528/126; 528/128; 528/172; 528/173; 528/176; 528/179; 528/183; 528/185; 528/220; 528/229; 528/350; 528/351; 528/353; 525/420; 525/422; 525/431; 525/474
(58) Field of Search ............... 528/26, 28, 38, 528/125, 126, 128, 172, 173, 170, 176, 179, 183, 185, 220, 229, 350, 353; 525/420, 422, 431, 474

(56) References Cited

U.S. PATENT DOCUMENTS

| | | | |
|---|---|---|---|
| 3,303,157 A | | 2/1967 | Boldebuck et al. ......... 524/726 |
| 3,981,847 A | | 9/1976 | Meyer et al. ............... 528/353 |
| 4,454,310 A | * | 6/1984 | Oka et al. .................. 528/188 |
| 4,520,095 A | * | 5/1985 | Igarashi et al. ............ 528/26 |
| 4,569,988 A | * | 2/1986 | Scola et al. ................ 528/353 |
| 4,847,358 A | * | 7/1989 | Kojima et al. ............. 528/353 |
| 4,973,645 A | * | 11/1990 | Lee ............................. 528/26 |
| 5,262,516 A | * | 11/1993 | Dellacoletta .............. 528/353 |
| 5,317,049 A | * | 5/1994 | Rojstaczer et al. ........ 524/600 |
| 5,723,571 A | * | 3/1998 | Oka et al. .................. 528/353 |
| 5,891,986 A | * | 4/1999 | Yamaguchi et al. ....... 528/310 |
| 6,218,496 B1 | * | 4/2001 | Rosenfeld et al. ......... 528/26 |

FOREIGN PATENT DOCUMENTS

EP     0274602 A     7/1988

* cited by examiner

*Primary Examiner*—P. Hampton-Hightower
(74) *Attorney, Agent, or Firm*—John G. Flaim; Ronald D. Trice; Baker & McKenzie

(57) ABSTRACT

A method of making a solution of a polyimide from a diamine monomer and a dianhydride monomer is disclosed. A solution or slurry of one of the monomers in a solvent that boils at a temperature between about 80° C. and about 160° C. is prepared. The solution or slurry is heated to a temperature between about 80° C. and about 160° C. and the other monomer is slowly added to the solution or slurry. Polyamic acid that is formed quickly imidizes to form the polyimide.

23 Claims, No Drawings

METHOD OF MAKING A POLYIMIDE IN A LOW-BOILING SOLVENT

CROSS-REFERENCE TO RELATED APPLICATION

This application is related to application Ser. No. 09/675,469 filed of even date by J. Rosenfeld et al, titled, "Low Temperature Bonding Adhesive Composition."

BACKGROUND OF THE INVENTION

This invention relates to a method of reacting a dianhydride and a diamine in a low-boiling solvent to make a polyimide. In particular, it relates to preparing a polyimide by slowly adding one of the monomers to a solution of the other monomer in a low-boiling, solvent that is heated to a temperature sufficient to fully imidize polyamic acid as soon as it is formed.

In chip scale packaging, semiconductor dies are attached to FR4 or BT substrates using a solution of a polyimidesiloxane adhesive. A temperature below 150° C. must be used to protect delicate electronic components. To achieve adhesion below 150° C., the solvent in the solution of the polyimidesiloxane adhesive must be removable at a temperature below 150° C., which means that solvents such as N-methyl pyrrolidinone (NMP), which boils at 202° C., cannot be used.

A polyimidesiloxane is made by reacting a dianhydride with a diamine in a solvent, forming an intermediate polyamic acid. That reaction will occur at room temperature. The solution of the polyamic acid is then heated to about 140 to about 150° C. to imidize the polyamic acid. While the intermediate polyamic acid is soluble in polar solvents such as NMP, unfortunately it is not soluble in the low-boiling solvents needed for low temperature adhesive applications, and a gummy precipitate forms. The polyimidesiloxane could be prepared in a high-boiling solvent, such as NMP, precipitated in water, washed, dried, and the solid polyimidesiloxane redissolved in a low-boiling solvent. It would be more convenient, less expensive, and less wasteful, however, to prepare the polyimidesiloxane in the low-boiling solvent and thereby avoid the extra evaporation and redissolving steps.

SUMMARY OF THE INVENTION

We have discovered a way to prepare a solution of a polyimide in a low-boiling solvent. In our invention, a solution or slurry is first prepared of one of the monomers in the solvent. That solution is heated to about 80 to about 160° C. and the other monomer is slowly added. By preparing the polyimide in this manner, the insoluble polyamic acid intermediate that is formed converts to the soluble polyimide before it can precipitate. Thus, the polyimide can be prepared in the same solvent in which it is to be used and it is not necessary to use one solvent for its preparation and a different solvent for its use.

DESCRIPTION OF THE PREFERRED EMBODIMENTS

This invention is applicable to any polyimide that is soluble in a low-boiling solvent as described herein.

The polyimide can be prepared by reacting an aromatic dianhydride with a diamine. Generally, stoichiometric quantities of diamine and dianhydride are used to obtain the highest molecular weight, but the equivalent ratio of dianhydride to diamine can range from 1:2 to 2:1.

Examples of suitable aromatic dianhydrides include:
1,2,5,6-naphthalene tetracarboxylic dianhydride;
1,4,5,8-naphthalene tetracarboxylic dianhydride;
2,3,6,7-naphthalene tetracarboxylic dianhydride;
2-(3',4'-dicarboxyphenyl)5,6-dicarboxybenzimidazole dianhydride;
2-(3',4'-dicarboxyphenyl)5,6-dicarboxybenzoxazole dianhydride;
2-(3',4'-dicarboxyphenyl)5,6-dicarboxybenzothiazole dianhydride;
2,2',3,3'-benzophenone tetracarboxylic dianhydride;
2,3,3',4'-benzophenone tetracarboxylic dianhydride;
3,3',4,4'-benzophenone tetracarboxyl dianhydride (BTDA);
2,2',3,3'-biphenyl tetracarboxylic dianhydride;
2,3,3',4'-biphenyl tetracarboxylic dianhydride;
3,3',4,4'-biphenyl tetracarboxylic dianhydride (BPDA);
bicyclo-[2,2,2]-octen-(7)-2,3,5,6-tetracarboxylic-2,3,5,6-dianhydride;
thio-diphthalic anhydride;
bis(3,4-dicarboxyphenyl)sulfone dianhydride;
bis(3,4-dicarboxyphenyl)sulfoxide dianhydride;
bis(3,4-dicarboxyphenyl oxadiazole-1,3,4)paraphenylene dianhydride;
bis(3,4-dicarboxyphenyl)2,5-oxadiazole1,3,4-dianhydride;
bis2,5-(3',4'-dicarboxydiphenylether)1,3,4-oxadiazole dianhydride;
bis(3,4-dicarboxyphenyl)ether dianhydride or 4,4'-oxydiphth alicanhydride (ODPA);
bis(3,4-dicarboxyphenyl)thioether dianhydride;
bisphenol A dianhydride (BPADA);
bisphenol S dianhydride;
2,2-bis(3,4-dicarboxyphenyl)hexafluoropropane dianhydride or 5,5-[2,2,2-trifluoro-1-(trifluoromethyl) ethylidene]bis-1,3-isobenzofurandione) (6FDA);
hydroquinone bisether dianhydride;
bis(3,4-dicarboxyphenyl)methane dianhydride;
cyclopentadienyl tetracarboxylic acid dianhydride;
cyclopentane tetracarboxylic dianhydride;
ethylene tetracarboxylic acid dianhydride;
perylene 3,4,9,10-tetracarboxylic dianhydride;
pyromellitic dianhydride (PMDA);
tetrahydrofuran tetracarboxylic dianhydride; and
resorcinol dianhydride.

The dianhydrides can be used in their tetraacid form or as mono, di, tri, or tetra esters of the tetra acid, but the dianhydride form is preferred because it is more reactive. The preferred dianhydride is ODPA because it has been found to give excellent properties. Mixtures of dianhydrides are also contemplated. Additional amounts of monoanhydrides or tri- or higher functional anhydrides can be used to control molecular weight or crosslinking.

The diamine used in preparing the polyimide is preferably aromatic as aromatic diamines give the best properties. Examples of aromatic diamines include:
m- and p-phenylenediamine;
2,4-diaminotoluene (TDA);
2,5- and 2,6-diaminotoluene;
p- and m-xylenediamine;
4,4'-diaminobiphenyl;
4,4'-diaminodiphenyl ether or 4,4'-oxydianiline; (ODA)
3,4'-oxydianiline;
4,4'-diaminobenzophenone;
3,3',3,4', or 4,4-diaminophenyl sulfone or m,m-, m,p- or p,p-sulfone dianiline;
4,4'-diaminodiphenyl sulfide;
3,3'-diaminodiphenyl sulfone (APS);
3,3' or 4,4'-diaminodiphenylmethane or m,m- or p,p-methylene dianiline;

3,3'-dimethylbenzidine;
2,2'-bis[(4-aminophenyl)-1,4-diisopropyl]benzene or 4,4'-isopropylidenedianiline or bisaniline P(BAP);
2,2'-bis[(4-aminophenyl)-1,3-diisopropyl]benzene or 3,3'-isopropylidenedianiline or bisaniline M;
methylene dianiline;
1,4-bis(4-aminophenoxy)benzene;
1,3-bis(4-aminophenoxy)benzene;
1,3-bis(3-aminophenoxy)benzene (APB);
4,4'-bis(4-aminophenoxy)biphenyl;
2,4-diamino-5-chlorotoluene;
2,4-diamino-6-chlorotoluene;
2,2-bis-[4(4-aminophenoxy)phenyl]propane (BAPP);
trifluoromethyl-2,4-diaminobenzene;
trifluoromethyl-3,5-diaminobenzene;
2,2-bis(4-aminophenyl)-hexafluoropropane (6F diamine);
2,2-bis(4-phenoxy aniline)isopropylidene;
2,4,6-trimethyl-1,3-diaminobenzene;
4,4'-diamino-5,5'-trifluoromethyl diphenyloxide;
3,3'-diamino-5,5'-trifluoromethyl diphenyloxide;
4,4'-trifluoromethyl-2,2'-diamino biphenyl;
2,5-dimethyl-1,4-phenylenediamine (DPD);
2,4,6-trimethyl-1,3-diaminobenzene;
diaminoanthraquinone;
4,4'-oxybis[(2-trifluoromethyl)benzeneamine] (1,2,4-OBABTF);
4,4'-oxybis[(3-trifluoromethyl)benzeneamine];
4,4'-thiobis[(2-trifluoromethyl)benzeneamine];
4,4'-thiobis[(3-trifluoromethyl)benzeneamine];
4,4'-sulfoxylbis[(2-trifluoromethyl)benzeneamine];
4,4'-sulfoxylbis[(3-trifluoromethyl)benzeneamine];
4,4'-ketobis[(2-trifluoromethyl)benzeneamine];
4,4'-[(2,2,2-trifluoromethyl-1-(trifluoromethyl)-ethylidene)bis(3-trifluoromethyl)benzeneamine]; and
4,4'-dimethylsilylbis[(3-trifluoromethyl)benzeneamine].

The preferred aromatic diamine is APB as it gives excellent properties. Mixtures of aromatic diamines are also contemplated. Additional amounts of monoamines or tri- or higher functional amines can be used to control molecular weight or crosslinking.

The polyimide is preferably a polyimidesiloxane because a polyimidesiloxane has better solubility in the low-boiling solvents used in this invention. To prepare a polyimidesiloxane, a diamine or dianhydride that contains siloxane groups is included as part of the diamine or the dianhydride. A polyimidesiloxane can be made from about 1 to about 80 wt % siloxane-containing monomers and about 20 to about 99 wt % monomers that do not contain siloxane. Preferably, it is made from about 20 to about 60 wt % siloxane-containing monomers and about 40 to about 80 wt % monomers that do not contain siloxane. The siloxane-containing monomer can be either aromatic or non-aromatic, but non-aromatic monomers are preferred as they are more readily available. Examples of siloxane diamines that can be used have the formula:

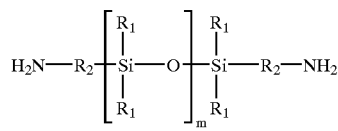

Examples of siloxane dianhydrides that can be used have the formula:

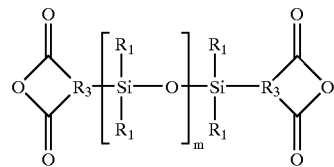

where $R_1$, $R_2$, and $R_3$ are mono, di, and triradicals, respectively, each independently selected from a substituted or unsubstituted 1 to 12 carbon atom aliphatic group or a substituted or unsubstituted 6 to 10 carbon atom aromatic group, where m is an average of 1 to 200. (Siloxane diamines are herein denoted by the notation "$G'''$".) Preferably, m is 1 to 12, $R_1$ is methyl, and $R_2$ is propyl as those compounds are more readily available and work well. Examples of monoradicals include —$CH_3$, —$CF_3$, —$CH=CH_2$, —$(CH_2)_nCF_3$, —$(CF_2)_nCF_3$, —$C_6H_5$, —$CF_2$—$CHF$—$CF_3$, and

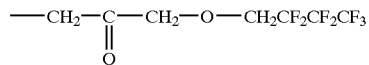

Examples of diradicals include —$(CH_2)_n$—, —$(CH_2)_n$—, —$CF_2$— and —$C_6H_4$—. Examples of triradicals include =$CH$—$CH_2$—,

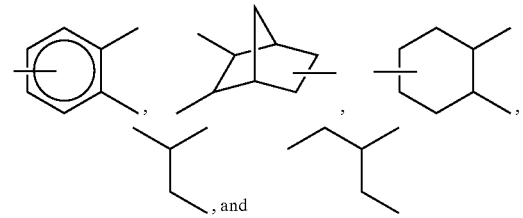

Mixtures of siloxane monomers are also contemplated. Siloxane diamines are preferred to siloxane dianhydrides as they are more readily available. To increase solubility in the low-boiling solvent and enhance material properties, the diamine is preferably a mixture of about 5 to about 55 wt % aromatic diamine that does not contain siloxane groups and about 45 to about 95 wt % aliphatic diamine that contains siloxane groups.

To prepare the polyimide, a slurry or solution in a low-boiling organic solvent is formed of either the dianhydride monomer or the diamine monomer, respectively. Because the dianhydride is usually less soluble than the diamine and it is more difficult to add the insoluble dianhydride to a solution of the diamine, it is preferable to form a slurry of the dianhydride monomer and add to it a warmed-up solution of the diamine in some of the low-boiling. The diamine is preferably a mixture of an aromatic diamine that does not contain siloxane groups and an aliphatic diamine that contains siloxane groups. A block copolymer can be formed by adding one of the two diamines to the slurry of the dianhydride before adding the other diamine.

The low-boiling solvent should have a boiling point between about 80 and about 160° C. as higher boiling solvents are too difficult to remove and lower boiling solvents evaporate too readily from the adhesive; the preferred boiling point of the solvent is about 120 to about 150° C. The invention is applicable to those solvents in which the polyamic acid is insoluble at a temperature below the temperature at which it imidizes, i.e., typically about 140° C. Such solvents are usually less polar, i.e., have a dipole moment of less than about 3.5. Examples of such solvents include anisole, toluene, xylene, cyclohexanone, cyclopentanone, methyl ethyl ketone, methyl isobutyl ketone, benzene, hydrocarbons, and mixtures thereof. Anisole, toluene, xylene, methyl ethyl ketone, methyl isobutyl ketone, and mixtures thereof are preferred and anisole is especially preferred because it has a high conversion to the imide, a low drying temperature, a low boiling point, and low toxicity. Toluene, benzene, and xylene form low-boiling azeotropes with the water that is condensed out during imidization. It is therefore preferable to add an azeotroping solvent with another low-boiling solvent to form an azeotrope with the water of imidization that is formed and keep the temperature at which the water is removed by distillation. The amount of azeotroping solvent should be sufficient to form an azeotrope with all of the water that is present; about 5 to about 30 wt % of azeotroping solvent, based on total solvent, is usually adequate.

The solution or slurry of either diamine or dianhydride in the solvent is heated to at least the temperature at which the polyamic acid fully imidizes, typically about 80 to about 160° C., and preferably at reflux. At lower temperatures the polyamic acid may precipitate or fail to fully imidize and at higher temperatures the method of this invention is not needed as higher-boiling solvents, such as NMP, can be used. The preferred temperature range is about 120 to about 150° C. Higher temperatures with low-boiling solvents can be used if the solution or slurry is under pressure. Sufficient solvent should be used so that the final solution of the polyimide is about 1 to about 40 wt % solids. Less solids require processing too much solvent and higher solids are too viscous. The solution of the polyimide is preferably about 25 to about 35 wt % solids. The other monomer (i.e., dianhydride or diamine) is then added to the solution or slurry, preferably in a small amount of the solvent. This addition is preferably at a rate that is slower than the rate of imidization, typically over about an hour, to avoid clumping and to keep the temperature constant. The dianhydride and the diamine react readily to form a polyamic acid, which almost immediately is converted into a fully (i.e., over 95%) imidized polyimide.

The following examples further illustrate this invention:

EXAMPLE 1

To a 2 liter 3-necked flask equipped with a mechanical stirrer, a thermometer, a reflux condenser and a Dean-Stark trap, 79.3 g (0.2557 mole) of ODPA, 210 g of anisole, and 61 g of toluene were charged; the temperature was raised to reflux. Into 248 g of anisole at 70° C. was dissolved 37.4 g (0.1279 mole) of APB and 110.5 g $G_g$. Using a additional funnel, the solution was slowly added to the refluxing reactor over an hour. The water generated in the reaction was removed to the Dean-Stark. After the addition was complete, refluxing continued at about 135° C. for 3 hours; 205 g of anisole, toluene, and water were removed, giving a resin content was 39.9 wt %. The imidization was 98.8%. From gel permeation chromatography (GPC) analysis, the Mw was 50,900 g/mole, the Mn was 28,400 g/mole, and the polydispersity was 1.8.

EXAMPLE 2

Comparative

To a 1 liter 3-necked flask equipped with a mechanical stirrer, a thermometer, a reflux condenser and a Dean-Stark trap was added 350 g anisole, 63 g toluene, 37.23 g APB, and 108 g $G_g$. The slurry was warmed slightly to about 30° C. to completely dissolve the APB and 79.77 g ODPA were added. The polymerization did not proceed at room temperature so the reactor temperature was raised over 30 minutes to the reflux temperature; the water was collected in a Dean-Stark trap. When the temperature reached about 70° C., a precipitate of polyamic acid appeared in the solution. As the temperature was raised higher, a solid, white lump of polyamic acid formed which dissolved as imidization proceeded. After three hours at reflux, 138 g of toluene, anisole, and water were removed. The resin content of the solution was 34 wt %. The imidization of the polyimidesiloxane was 97.4% and, from the GPC analysis, Mw was 42,500, Mn was 26,500 g/mole, and the polydispersity was 1.6.

EXAMPLE 3

To a 22 liter 3-necked flask equipped with a mechanical stirrer, a thermometer, a reflux condenser and a Dean-Stark trap was added 871.97 g ODPA, 2311 g anisole, and 676 g toluene. The temperature was raised to reflux and 410.7 g APB and 1188.4 g $G_g$ dissolved in 2725 g anisole at 70° C. was mixed into the solution of APB over an hour. After the addition was complete, the temperature was held at reflux for 3 hours; 2,252 g of anisole, toluene, and water were removed; the resin content was 39.7 wt %. From GPC analysis, Mw was 50,900 g/mole, Mn 28,400 g/mole, and polydispersity was 1.79.

EXAMPLE 4

To a 1 liter 3-necked flask equipped with a stirrer, an additional funnel, and a Dean-Stark trap with a reflux condenser under nitrogen purge was added 79.7 g ODPA, 300 g anisole, and 73 g toluene; the temperature was raised to reflux. To make a siloxane segment rich in the middle of the polymer molecules, 108.5 g $G_g$ was added first over 30 minutes. After the addition was complete, the reflux continued for 30 minutes longer. Then 18.7 g APB and 54.2 g $G_g$ in 238 g anisole were warmed to 70° C. to completely dissolve the APB. The solution of APB and $G_g$ was added to the refluxing solution over 30 minutes using an additional funnel. After the addition was complete, the reaction was continued at reflux for 2½ hours to remove water, toluene, and anisole. The solids content was about 40 wt %, the imidization was 95%, and the resin content was 39.6%. From GPC analysis, the Mw was 50,000 g/mole, the Mn was 31,000, and the polydispersity was 1.6.

EXAMPLE 5

Example 4 was repeated using 79.7 g ODPA, 300 g $G_9$ anisole, and 73 g toluene. To make the aromatic diamine rich in the middle of polymer molecules, a solution of 18.7 g APB and 54.2 g in 237 g anisole warmed to 70° C. was added to the refluxing reactor over 30 minutes. Then 108 g $G_g$ was added over 30 minutes and the refluxing continued for 2½ hours to distill off water, toluene, and anisole. The solids content was about 40 wt %, the imidization was 94.7%, and the resin content was 38.4%. From GPC analysis, the Mw and Mw were 35,000 g/mole and 23,000 g/mole, respectively, and the polydispersity was 1.53.

We claim:
1. A method of making a solution of a polyimide from a diamine monomer and a dianhydride monomer comprising
   (A) preparing a solution or slurry of one of said monomers in at least one solvent that boils at a temperature between about 80° C. and about 160° C.;

(B) heating said solution or slurry to a temperature between about 80° C. and about 160° C.; and (C) slowly adding the other of said monomers to said solution or slurry, whereby polyamic acid that is formed quickly imidizes to form said polyimide.

2. A method according to claim 1 wherein said polyimide does not contain siloxane groups.

3. A method according to claim 1 wherein said polyimide is a polyimidesiloxane.

4. A method according to claim 3 wherein said polyimidesiloxane is made from about 20 to about 99 wt % of a monomer that does not contain siloxane groups and about 1 to about 80 wt % of a monomer that contains siloxane groups.

5. A method according to claim 4 wherein said dianhydride monomer is aromatic and does not contain siloxane groups.

6. A method according to claim 5 wherein said diamine monomer is a mixture of about 5 to about 55 wt % of an aromatic diamine that does not contain siloxane groups and about 45 to about 95 wt % of an aliphatic diamine that contains siloxane groups.

7. A method according to claim 6 wherein said aromatic diamine is 1,3-bis(3-aminophenoxy)benzene.

8. A method according to claim 6 wherein said siloxane containing diamine has the general formula:

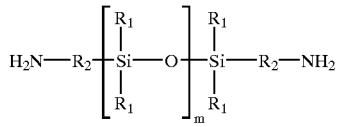

where $R_1$ and $R_2$ are mono and diradicals, respectively, each independently selected from a substituted or unsubstituted 1 to 12 carbon atom aliphatic group or a substituted or unsubstituted 6 to 10 carbon atom aromatic group, and m is an average of 1 to 200.

9. A method according to claim 1 wherein said solvent is a mixture of two solvents, one of which forms a low-boiling azeotrope with water.

10. A method according to claim 1 wherein said solvent is selected from the group consisting of anisole, toluene, xylene, methyl ethyl ketone, methyl isobutyl ketone, and mixtures thereof.

11. A method of making a solution of a polyimide from a diamine monomer and a dianhydride monomer comprising:

(A) preparing a solution or slurry of one of said monomers in at least one solvent that boils at a temperature between about 80° C. and about 160° C.;

(B) heating said solution or slurry to a temperature between about 80° C. and about 160° C.; and (C) slowly adding the other of said monomers to said solution or slurry, whereby polyamic acid that is formed quickly imidizes to form said polyimide, wherein said solvent is anisole.

12. A method according to claim 1 wherein said monomer in step (A) is the dianhydride.

13. A method of making a solution of a polyimide from first and second diamine monomers and a dianhydride monomer comprising:

(A) preparing a solution or slurry of one of a dianhydride monomer in at least one solvent that boils at a temperature between about 80° C. and about 160° C.;

(B) heating said solution or slurry to a temperature between about 80° C. and about 160° C.; and (C) slowly adding said first and second diamine monomers to said solution or slurry, whereby polyamic acid that is formed quickly imidizes to form said polyimide, wherein one of said first and second diamine monomers is added to said slurry before the other of said first and second diamine monomers is added to said slurry.

14. A method of making a solution of a polyimide from a diamine monomer and a dianhydride monomer comprising:

(A) preparing a solution or slurry of one of said monomers in at least one solvent that boils at a temperature between about 80° C. and about 160° C.;

(B) heating said solution or slurry to a temperature between about 80° C. and about 160° C.; and (C) slowly adding the other of said monomers to said solution or slurry, whereby polyamic acid that is formed quickly imidizes to form said polyimide, wherein said diamine is warmed up to dissolve it in some of said solvent and the resulting solution is added slowly to said slurry.

15. A method of making a solution of a polyimide from a diamine monomer and a dianhydride monomer comprising:

(A) preparing a solution or slurry of one of said monomers in at least one solvent that boils at a temperature between about 80° C. and about 160° C.;

(B) heating said solution or slurry to a temperature between about 80° C. and about 160° C.; and (C) slowly adding the other of said monomers to said solution or slurry, whereby polyamic acid that is formed quickly imidizes to form said polyimide, wherein said dianhydride monomer is bis(3,4-dicarboxyphenyl)ether dianhydride.

16. A method of making a solution of a polyimidesiloxane comprising:

(A) preparing a slurry of an aromatic dianhydride in a solvent selected from the group consisting of anisole, toluene, xylene, methyl ethyl ketone, methyl isobutyl ketone, and mixtures thereof using sufficient solvent to form a solution of said polyimidesiloxane of about 1 to about 40 wt % solids;

(B) heating said slurry to a temperature between about 120° C. and about 150° C.; and (C) slowly adding to said slurry about an amount of diamine, said diamine comprising about 5 to about 55 wt %, based on total diamine weight, of an aromatic diamine that does not contain siloxane groups and about 45 to about 95 wt %, based on total diamine weight, of an aliphatic diamine that contains siloxane groups, whereby polyamic acid that is formed imidizes before it precipitates.

17. A method of making a solution of a polyimidesiloxane comprising:

(A) preparing a slurry of an aromatic dianhydride in a solvent selected from the group consisting of anisole, toluene, xylene, methyl ethyl ketone, methyl isobutyl ketone, and mixtures thereof using sufficient solvent to form a solution of said polyimidesiloxane of about 1 to about 40 wt % solids;

(B) heating said slurry to a temperature between about 120° C. and about 150° C.; and (C) slowly adding to said slurry about a stoichiometric amount of diamine, said diamine comprising about 5 to about 55 wt %, based on total diamine weight, of an aromatic diamine that does not contain siloxane groups and about 45 to about 95 wt %, based on total diamine weight, of an aliphatic diamine that contains siloxane groups, whereby polyamic acid that is formed imidizes before it precipitates, wherein one of said diamines is added to said slurry before the other of said diamines is added to said slurry.

18. A method of making a solution of a polyimidesiloxane comprising:

(A) preparing a slurry of an aromatic dianhydride in a solvent selected from the group consisting of anisole, toluene, xylene, methyl ethyl ketone, methyl isobutyl ketone, and mixtures thereof using sufficient solvent to form a solution of said polyimidesiloxane of about 1 to about 40 wt % solids;

(B) heating said slurry to a temperature between about 120° C. and about 150° C.; and (C) slowly adding to said slurry about a stoichiometric amount of diamine, said diamine comprising about 5 to about 55 wt %, based on total diamine weight, of an aromatic diamine that does not contain siloxane groups and about 45 to about 95 wt %, based on total diamine weight, of an aliphatic diamine that contains siloxane groups, whereby polyamic acid that is formed imidizes before it precipitates, wherein said solvent is a mixture of anisole and a solvent selected from the group consisting of toluene, xylene, and benzene.

19. A method of making a solution of a polyimidesiloxane comprising (A) preparing a slurry of bis(3,4-dicarboxyphenyl)ether dianhydride in mixture of anisole and a sufficient amount of a solvent selected from the group consisting of toluene, xylene, and benzene to azeotrope water in said slurry, using a sufficient amount of both solvents to form a solution of said polyimidesiloxane of about 20 to about 35 wt % solids;

(B) heating said slurry to a temperature between about 120° C. and about 150° C.; and (C) slowly adding to said slurry about a stoichiometric amount of diamine, said diamine comprising about 40 to about 80 wt %, based on total monomer weight, of 1,3-bis(3-aminophenoxy)benzene and about 20 to about 60 wt %, based on total monomer weight, of aliphatic diamine having the general formula

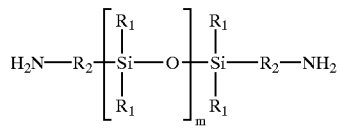

where $R_1$ is methyl, $R_2$ is propyl, and m is an average of 1 to 12, whereby polyamic acid that is formed imidizes to form said polyimide before it precipitates.

20. A method according to claim 19 wherein one of said diamines is added to said slurry before the other of said diamines is added to said slurry.

21. A method according to claim 1 wherein said slowly adding the other of said monomers to said solution or slurry occurs after said heating said solution or slurry to a temperature between about 80° C. and about 160° C.

22. A method according to claim 16 wherein the amount of diamine is a stoichiometric amount.

23. A method of making a solution of a polyimidesiloxane comprising:

(A) preparing a slurry of bis(3,4-dicarboxyphenyl)ether dianhydride in mixture of anisole and a sufficient amount of a solvent selected from the group consisting of toluene, xylene, and benzene to azeotrope water in said slurry, using a sufficient amount of both solvents to form a solution of said polyimidesiloxane of about 20 to about 35 wt % solids;

(B) heating said slurry to a temperature between about 120° C. and about 150° C.; and (C) slowly adding to said slurry about an amount of diamine, said diamine comprising about 40 to about 80 wt %, based on total monomer weight, of 1,3-bis(3-aminophenoxy)benzene and about 20 to about 60 wt %, based on total monomer weight, of aliphatic diamine having the general formula

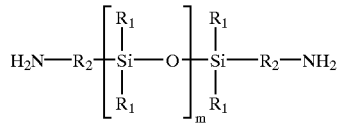

where $R_1$ is methyl, $R_2$ is propyl, and m is an average of 1 to 12, whereby polyamic acid that is formed imidizes to form said polyimide before it precipitates.

* * * * *

UNITED STATES PATENT AND TRADEMARK OFFICE
CERTIFICATE OF CORRECTION

PATENT NO.    : 6,451,955 B1
DATED         : September 17, 2002
INVENTOR(S)   : Michael C. Hausladen et al.

It is certified that error appears in the above-identified patent and that said Letters Patent is hereby corrected as shown below:

Column 6,
Line 2, after "comprising", insert -- : --;

Column 9,
Line 2, after "comprising", insert -- : --; and

Signed and Sealed this

Twenty-fifth Day of February, 2003

JAMES E. ROGAN
*Director of the United States Patent and Trademark Office*